Jan. 20, 1925.
E. F. NORTHRUP
Re. 15,987
CONTROL APPARATUS
Original Filed Feb. 16, 1909 2 Sheets-Sheet 1
Fig. 1.
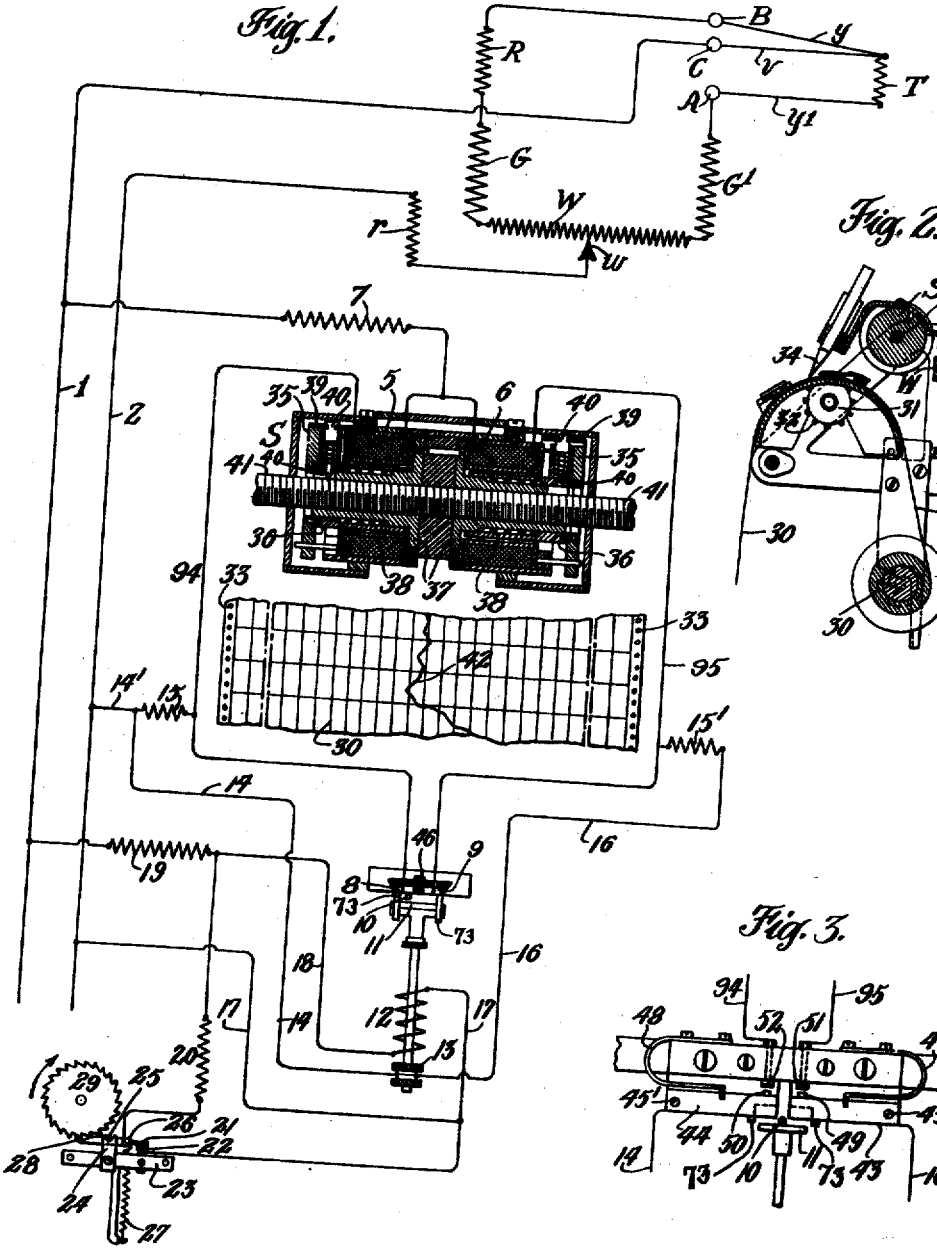
Fig. 2.
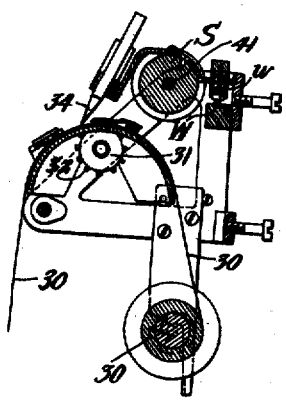
Fig. 3.
WITNESSES:
N. Field
A. Farrell
INVENTOR
Edwin F. Northrup
BY Cornelius D. Ehret
his ATTORNEY Jan. 20, 1925.

E. F. NORTHRUP

Re. 15,987

CONTROL APPARATUS

Original Filed Feb. 16, 1909 2 Sheets-Sheet 2

WITNESSES:
A. Field
A. Farrell

INVENTOR
Edwin H. Northrup
BY Cornelius D. Ehret
his ATTORNEY

Reissued Jan. 20, 1925. Re. 15,987

UNITED STATES PATENT OFFICE.

EDWIN F. NORTHRUP, OF PRINCETON, NEW JERSEY, ASSIGNOR TO LEEDS AND NORTHRUP COMPANY, A CORPORATION OF PENNSYLVANIA.

CONTROL APPARATUS.

Original application filed February 16, 1909, Serial No. 478,144, which was divided and application filed October 25, 1909. Serial No. 524,349, Patent No. 1,022,498, dated April 9, 1912. Application for reissue filed June 30, 1923. Serial No. 648,834.

*To all whom it may concern:*

Be it known that I, EDWIN F. NORTHRUP, a citizen of the United States, now residing at Princeton, county of Mercer, State of New Jersey, have invented certain new and useful Improvements in Control Apparatus, of which the following is a specification.

My invention resides in a system of and apparatus for exercising control over mechanism or apparatus to cause the same to be controlled or actuated in response to changes in temperature.

It is characteristic of my invention that a selector is provided for choosing or selecting a path along which mechanical, electrical, or other energy shall flow or shall be transmitted, the selecting apparatus being suitably controlled or actuated in response to changes in temperature, and the energy transmitted over the selected path may be utilized for effecting movements or circuit controls in different directions or senses and of extents dependent upon the sense and magnitude of change of temperature.

In or as the selecting apparatus, I may employ a galvanometer controlled by a temperature-responsive device and which shall control or cause the selection of a path along which energy shall flow or be transmitted, a periodically controlled or operating device co-operating with the galvanometer, whereby a path for energy may be periodically provided upon deflection of the galvanometer.

It is a feature of my invention that in making the selection of a path, no work is done, whereas the amount of energy transmitted over the path selected may be as great as desired; and the energy so available over the selected path may be used for any purpose, as for actuating or controlling apparatus or a translating device.

My invention resides in other features of system and apparatus hereinafter described and pointed out in the claims.

The application of the original patent is a division of my prior application upon which were granted Letters Patent of the United States No. 950,555, March 1, 1910.

Figure 5:
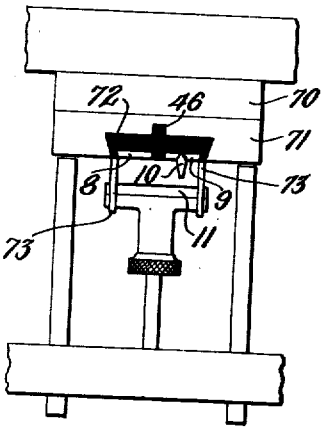
Figure 4:
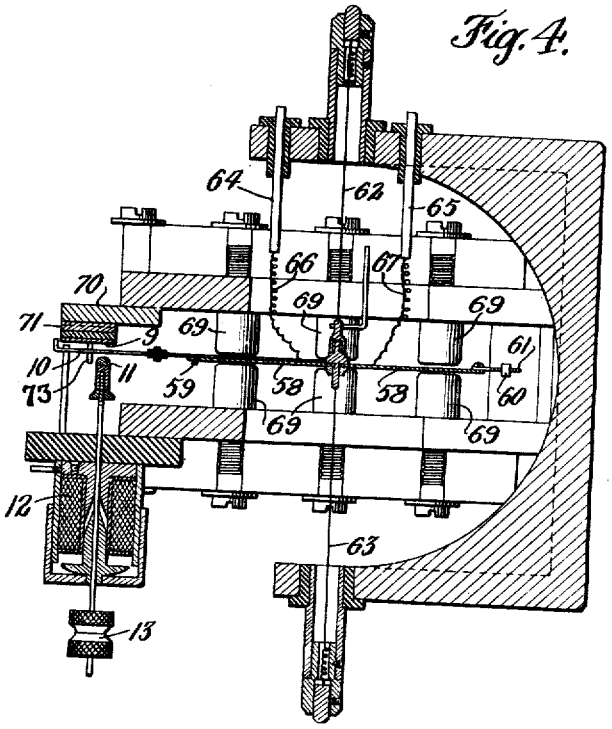
Figure 6:
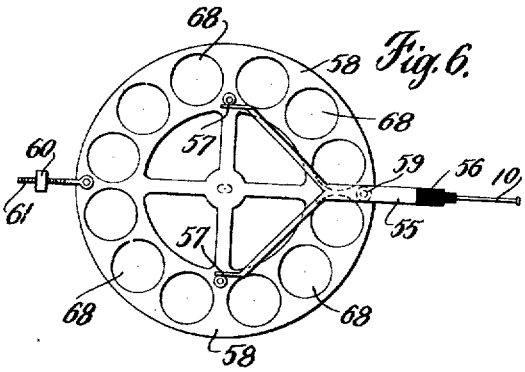

For an illustration of one of the forms my invention may take, reference is to be had to the accompanying drawing, in which:

Fig. 1 is a diagrammatic view illustrating an application of my invention. Fig. 2 is a side elevational view, some parts in section, of a piece of controlled mechanism or a translating device. Fig. 3 is a front elevational view of a modified arrangement for selecting and providing a path along which energy may be transmitted. Fig. 4 is a vertical sectional view, some parts in elevation through a galvanometer and contacting device. Fig. 5 is a front elevation, on larger scale, of a part of the galvanometer, showing the contacting device. Fig. 6 is a plan view of the moving member or system of the galvanometer, comprising moving coils and their support, and a galvanometer needle or pointer.

Referring to Fig. 1, T represents a temperature-responsive device, as a thermometer resistance, while $v$, $y$ and $y'$ are the thermometer leads, G and G′ are the two differential windings of a galvanometer, R is a fixed resistance which may be employed, and W is a conductor with which engages the contact $w$, movable by the step-by-step mechanism, hereinafter described, for restoring balance. Conductors 1 and 2 connect with any suitable source of electrical energy, such, for example, as a commercial lighting or power circuit of 110 volts or any other pressure.

The windings 5 and 6 are those of two electro-magnets of the step-by-step mechanism which moves the marker and the contact $w$ over the conductor W. It is to be understood, however, that these windings may be windings used for any other purpose in any suitable translating device, which translating instrument may exercise any suitable control or do any suitable work. Between the conductor 1 and the common terminal of the windings 5 and 6 there is inserted a suitable resistance 7, when required, for limiting the current flow through the windings 5 and 6. The other terminals of the windings 5 and 6 connect, respectively, through conductors 94 and 95 with the contacts 8 and 9 supported in operative relation with the normally freely moving or deflecting member 10 which may be a part of or attached to the needle of a galvanometer, or any other electrical, chemical, or mechanical instrument or device.

The member 10 is any movable member which is deflected or moved in response to changes in temperature. In the arrangement shown in Fig. 1, member 10 operates as an electrical conductor or contact to place either of the contacts 8 or 9 into electrical communication with the contact 11 which is moved upwardly to engage the contact 10 to clamp it between contact 11 and either of the contacts 8 or 9, upon the energization of the solenoid or magnet whose winding is 12. From the contact 8 to the binding post 13, the latter movable with the core of the solenoid whose winding is 12 and making electrical communication with the contact 11, extends a conductor 14 in which is connected a suitable resistance 15. And, similarly, from contact 9 to the binding post 13, extends a conductor 16 in which is connected a suitable resistance 15′, the conductors 14 and 16, and, therefore, contact 11, being also in communication with conductor 2 of the supply circuit through conductor 14′. The winding 12 is connected across the conductors 1 and 2 by the conductors 17 and 18, suitable resistance 19 intervening, if necessary. In shunt to the winding 12 is connected a circuit including the resistance 20 and the contacts 21 and 22 which are normally in engagement with each other, and when so in engagement they shunt the winding 12 to deenergize the same. When the contacts 21 and 22 separate, the winding 12 is energized and operates to lift the contact 11 to clamp the member 10 against either of contacts 8 or 9, depending upon the direction of deflection of the member 10, or if not deflected, against the insulation material 46. The contact 22 is adjustably mounted upon the support 23. In a bracket 24 there is pivoted at 25 a lever 26 whose outer end carries the cooperating contact 21. The contacts 21 and 22 are normally held in engagement by the action of spring 27. At the opposite end of the lever 26 there is a hook-like termination 28 with which engage the teeth of the wheel 29 forming part of or associated with a clock mechanism, the direction of rotation being that indicated by the arrow. As the wheel 29 rotates a tooth engages the hook 28 and slightly tilts the lever 26 to separate the contacts 21 and 22 a short distance. This distance may be made very short indeed, because the contacts 21 and 22 are in a shunt circuit where practically no sparking will occur. From the fact that the lever 26 need be shifted only very slightly, there is only slight engagement between the teeth of the wheel 29 and the hook 28, thus introducing a minimum of friction and requiring the clock mechanism to do a minimum of work. And from the relatively slight overlap of the teeth and the hook 28, flows a further result that actuation of the lever 26 is nicely timed, and the separation of the contacts 21 and 22 is relatively short. The clock mechanism, therefore, causes a periodic energization of the magnet or solenoid 12 resulting in the periodic elevation of the contact 11 to clamp the member 10, if deflected, against either one or the other of the contacts 8 or 9, depending upon the direction of deflection. If the galvanometer or other device of which the member 10 is a part or by which the member 10 is controlled, is in balance, the member 10 will come opposite the space or insulation 46 and no circuit will be completed to energize or actuate a translating device, as the step-by-step mechanism carrying the marker and contact.

By the clock mechanism, which may be the same as that controlling the contacts 21 and 22, the record sheet 30 is fed by the feed wheel 31 whose spurs 32 engage in the perforations 33 of the record sheet to feed the same past and under the marker 34 carried by the step-by-step mechanism S shown in longitudinal section in Fig. 1. This step-by-step mechanism also moves the movable contact *w* which engages the conductor W to control any suitable circuit, here shown as means for rebalancing the galvanometer circuit.

The step-by-step mechanism comprises the windings 5 and 6, each provided with an armature 35 having a cylindrical shank 36 adapted, when the associated winding is energized, to move until limited by engagement with flange 37. A helical spring 38 serves to hold each armature in unattracted position. Carried by each armature member 35 is a loosely mounted iron strap 39 constituting an associate armature and which, upon the energization of a winding, is adapted to be immediately attracted radially to cause the pointed member 40 to project into the longitudinal bore through which extends a roughened or finely screw-threaded rod 41, a helical spring serving to retract the pointed member 40 when the electro-magnet is deenergized. In Fig. 1 the parts are shown in a position corresponding with energization of the winding 5, with the member 36 abutting against flange 37 and the subsidiary armature 39 in attracted position and the pointed member 40 in engagement with the rod 41.

When either winding is energized, for example winding 5, the armature 39 and the attached pointed member 40, having relatively small inertia, are first actuated to grip the roughened or screw-threaded rod 41. This fixes the member 35, and further attraction causes the winding and the remainder of the device to be attracted toward the member 35, until the limit of its movement is reached. By this operation, therefore, the whole device has moved along the rod or member 41 a definite distance and upon deenergization of the winding 5, the device remains in its new position and the armature 35 moves outwardly after the member 40 has been released. Successive energizations cause similar and equal spacings of the device which, as before noted, carries a marker, or a movable contact, of which may do any other work.

The operation is as follows: The clock mechanism constantly rotates at a uniform rate feeding the record sheet or paper 30 past the marker 34, the marker tracing a straight line upon the record until the step-by-step mechanism S is actuated. When the temperature changes or varies, the resistance of the thermometer bulb T changes or varies and will thus cause more current to pass through one of the galvanometer coils G or G′ than through the other, causing the moving system of the galvanometer to deflect from the zero or balance position. In so doing, the moving system does no work, the contact 10 being freely carried through space. Supposing the deflection to be toward the left, as viewed in Fig. 1, due to such unbalancing, at the following energization of the winding 12, the contact 10 is clamped between contacts 8 and 11, thus short circuiting the resistance 15 and causing increased current to flow through the winding 5 of the step-by-step mechanism, such current being sufficient to cause the step-by-step mechanism to be energized or to operate, the pointed member 40 being first attracted into engagement with the roughened or screw-threaded member 41 and then the device S is attracted toward the left, as previously described. This moves the marker 34 a definite distance or increment across the record sheet 30. Simultaneously, however, the contact *w* is moved along the resistance conductor W in such direction as to tend to restore a balance of the current in the two windings of the galvanometer. If this increment of movement of the step-by-step mechanism has been sufficient to restore a balance, the contact 10 carried by the galvanometer pointer, comes to mid position, and upon the next energization of the magnet 12, the contact 10 will contact insulating material, or, at any rate, will complete no circuit. If, however, balance has not been restored, the contact 10 will remain to the left, as viewed in Fig. 1, and the next energization of the magnet 12 will cause the step-by-step mechanism to move another increment to the left. This action keeps up until balance is restored. And, similarly, if the contact 10 be deflected toward the right, the step-by-step mechanism is moved toward the right until a balance is reached. And thus moving backward and forward across the sheet the marker or pencil produces a line record, as 42, indicated on the record sheet 30 in Fig. 1.

While the member 10, hereinbefore described, has been shown as a contact to cause or control an electrical circuit, such member 10 may be used simply as a mechanical device, as shown in Fig. 3, which, when deflected, to right or left, and when raised by member 11, may engage one or the other of the two levers 43 or 44 pivoted, respectively, at 45 and 45′ the levers being pressed downwardly by the springs 47 and 48, against suitable stops. When the member 10 is in balance it lies between the ends of the levers 43 and 44, and when raised by the periodically operating member 11, the member 10 does not engage either of the levers. When the member 10, which may be of insulating material in this case, is deflected, it is raised by the member 11 into engagement with the under side of either one of the levers 43 or 44, and the member 11 then transmits mechanical energy through the member 10 to lift the lever which has been engaged in opposition to its spring. The levers 43 and 44 carry the contacts 49 and 50, respectively, which engage, respectively, with contacts 51 and 52, with which communicate the conductors 95 and 94, respectively, for purposes such as shown in Fig. 1. In electrical communication with contact 49 is conductor 16, and in communication with contact 50 is conductor 14, for the purposes illustrated in Fig. 1.

The operation is the same as described in connection with Figs. 1 and 2, except that the member 10 operates simply as a mechanical medium through which the mechanical power of the member 11 is transmitted to actuate the levers 43 and 44 to make contact for controlling the step-by-step mechanism. Or the mechanical energy so transmitted through the member 10 may do any suitable work, or the electrical energy controlled by the levers 43 and 44 may do any suitable work to control or actuate any suitable translating device.

Without limiting my invention thereto, but only for the purpose of illustration of an example of galvanometer and contacting device, reference may be had to Figs. 4, 5 and 6.

The member 10 is carried by or is a part of the galvanometer pointer or needle 55, suitable insulation 56 intervening when desired. The needle 55 is pivoted or hinged to the aluminum disk 58 at 57, 57, so that when the winding 12 is energized the contact 11 lifts the contact 10 and may clamp it into engagement with either of the stationary contacts 8 or 9, the pointer or needle 55 moving during such action upon its hinges or pivots. An adjusting screw 59, Fig. 4, passes through the disk 58 and engages the under side of the pointer or needle 55, so as to determine or adjust its normal elevation. A counterweight 60 is adjustable upon the screw 61 carried by the disk 58.

The moving system of the galvanometer has a filar or torsion suspension by means of the conducting wires 62, 63, which are insulated from each other and may serve as the terminals of one of the differential windings, as G, Fig. 1, of the moving system. The insulated studs 64 and 65 may serve as the terminals for the other differential winding, as G′, Fig. 1, flexible connections 66 and 67 leading from these studs 64, 65, to the other differential winding also carried by the disk 58. The coils 68, shown by way of example, in Fig. 6, as twelve (12) in number, are preferably bifilarly wound, that is, each coil 68 is made up of two windings, these two separate windings constituting the differential windings G and G′ of the instrument. These bifilarly wound coils are differentially wound or differentially connected and are supported in the magnetic field maintained by permanent magnets having the pole pieces 69 which are preferably disposed with respect to the coils in the manner described in Letters Patent of the United States No. 800,873, and the moving system suspension is substantially that described in said Letters Patent. It is to be understood however, that this invention is not limited to a galvanometer of this construction or type.

At the front of the galvanometer upon a plate 70 is secured a plate 71 upon which is secured the insulation 72, such as ivory, upon which are secured the silver or other contacts or plates 8 and 9 insulated from each other and from the frame or parts of the galvanometer.

As seen in Fig. 5, on larger scale, the contact 10 may swing to right or left beneath the contacts 8 and 9, the studs or pins 73, 73 carried by plate 71, serving as stops and serving also to prevent the T-shaped head carrying the contact 11 from turning.

I do not claim the hereinbefore described recording system and apparatus, the same being claimed in my aforesaid Patent No. 950,555.

What I claim is:

1. The combination with a galvanometer having a movable member, of means responsive to temperature changes for controlling said galvanometer to effect deflection of said movable member, a path over which energy may be transmitted, said path being normally incomplete, a second member periodically actuating said movable member to seselected and completed path, and means controlled by the energy transmitted over said selected and completed path and means controlled by said apparatus producing a change in the effect of said temperature responsive means upon said galvanometer.

2. The combination with a galvanometer having a member deflecting from a normal substantially fixed position, of means responsive to temperature changes for controlling said galvanometer to effect deflection of said member, a second member periodically actuating said deflecting member, a movable structure, a source of energy, means co-acting with said deflecting member when deflected and periodically actuated for causing actuation of said movable structure by energy from said source in a direction dependent upon the direction of deflection of said deflecting member from its said normal position, and means controlled by said movable structure causing a change in the effect of said temperature responsive means upon said galvanometer to decrease the deflection of said deflecting member.

3. The combination with a freely movable member, of means responsive to temperature changes for controlling said member, a second member periodically actuating said movable member, and step-by-step mechanism having a movable part moving by equal increments in response to the successive actuations of said movable member by said second member.

4. The combination with an instrument having differential windings, of circuit balancing means comprising a resistance and a movable contact, one of said differential windings of said differential instrument and a thermometer resistance being connected in one branch of a circuit, said differential instrument having a movable member, another of said differential windings of said differential instrument being connected in another branch of said circuit, a second member periodically actuating said movable member of said differential instrument, and apparatus actuated in response to said actuation of said movable member.

5. The combination with an instrument having differential windings, of circuit balancing means comprising a resistance and a movable contact, one of said differential windings of said differential instrument and a thermometer resistance being connected in one branch of a circuit, said differential instrument having a movable member, another of said differential windings of said differential instrument being connected in another branch of said circuit, a second member periodically actuating said movable member of said differential instrument, and step-by-step mechanism actuated through equal increments in response to successive actuations of said movable member.

6. Control apparatus comprising the combination with a selector member, of apparatus responsive to temperature changes for exerting a force on said selector member for deflecting it, paths over which energy may be transmitted, a second member periodically engaging said selector member, a plurality of means with which said selector member selectively engages when engaged by said second member, thereby permitting the transmission of energy over one of said paths, movable structure, means controlled by the energy transmitted over said one of said paths for actuating said movable structure in a direction and to an extent dependent upon the direction and extent of movement of said selector member, and means controlled by said movable structure effecting a change in the force exerted on the selector member by said apparatus.

7. Control apparatus comprising the combination with a selector member, of apparatus responsive to changes in temperature for exerting a force on said selector member for deflecting it, paths over which energy may be transmitted, means periodically actuating said selector member for causing periodic control of one or the other of said paths when said selector member is deflected, control apparatus controlled by the energy transmitted over the selected path, and means controlled by said control apparatus influencing said first named apparatus to cause a change in the deflection of said selector member.

8. Control apparatus comprising the combination with a selector member deflecting in opposite directions from a fixed normal position, of apparatus responsive to changes in temperature for exerting a force on said selector member for deflecting it, paths over which energy may be transmitted, means periodically actuating said selector member for causing periodic control of one or the other of said paths when said selector member is deflected, control apparatus controlled by the energy transmitted over the selected path, and means controlled by said control apparatus influencing said first named apparatus to cause a change in the deflection of said selector member.

9. Control apparatus comprising the combination with a selector member, of apparatus responsive to changes in temperature for exerting a force on said selector member for deflecting it, a stop against which said selector member engages, a path over which energy may be transmitted, a second member periodically engaging and moving said selector member, means periodically actuating said second member, means against which said selector member may be moved by said second member when said selector member is deflected from said fixed normal position, said selector member when moved against said last named means causing the transmission of energy over said path, movable structure, means controlled by the energy transmitted over said path actuating said movable structure in a direction depending upon the direction of deflection of said selector member from said fixed normal position and to an extent dependent upon the number of engagements between said second named means and said selector member, and means controlled by said movable structure effecting a change in the force exerted on said selector member by said apparatus.

10. Control apparatus comprising the combination with a selector member deflecting in opposite directions, of apparatus responsive to changes in temperature exerting a force on said selector member for deflecting it, a plurality of circuits, co-acting contacts controlling each of said circuits, means periodically actuating said selector member for causing periodic control of one or the other of said circuits through its contact when said selector member is deflected, control apparatus controlled by said circuits and comprising movable structure, means for actuating said movable structure in a direction and an extent depending upon the direction of deflection of said selector member and the number of circuit closures, a circuit controlled by said control apparatus, and means in said last named circuit controlling said first named apparatus.

11. Control apparatus comprising the combination with a selector member, of apparatus responsive to changes in temperature exerting a force on said selector member for deflecting it, a plurality of circuits, co-acting contacts controlling each of said circuits, means periodically actuating said selector member for causing periodic control of one or the other of said circuits through its contacts when said selector member is deflected, control apparatus controlled by said circuits, a circuit controlled by said control apparatus, and means in said last named circuit influencing said first named apparatus in a sense tending to cause return of said selector member towards normal position.

12. Control apparatus comprising the combination with a selector member, of apparatus responsive to changes in temperature exerting a force on said selector member for deflecting it, a circuit, co-acting contacts controlling said circuit, means periodically actuating said selector member for causing periodic closure of circuit through said contacts when said selector member is deflected, movable structure, means controlled by said circuit for actuating said movable structure in a direction and an extent depending upon the direction of deflection of said selector member and the number of closures of said circuit, and means controlled by said movable structure effecting a change resulting in a change in the force exerted on said selector member by said apparatus.

13. Control apparatus comprising the combination with a selector member deflecting in opposite directions from a fixed normal position, of apparatus responsive to changes in temperature for exerting on said selector member a force to deflect it in either direction, a pair of circuits, a pair of co-acting contacts controlling each of said circuits, means periodically engaging said selector member for effecting periodic closures of one or the other of said circuits depending upon the direction of deflection of said selector member, movable structure, means controlled by said circuits for actuating said movable structure in one direction or the other depending upon the direction of deflection of said selector member, and means actuated by said movable structure effecting a change in the force exerted on said selector member by said apparatus.

14. Control apparatus comprising the combination with a selector member deflecting in opposite directions from a fixed normal position, of apparatus responsive to changes in temperature for exerting on said selector member a force to deflect it in either direction, a pair of circuits, a pair of co-acting contacts controlling each of said circuits, means periodically engaging said selector member for effecting periodic closures of one or the other of said circuits depending upon the direction of deflection of said selector member, movable structure, means controlled by said circuits for actuating said movable structure in one direction or the other depending upon the direction of deflection of said selector member, and means causing a change in the deflection of said selector member comprising a circuit, and a contact controlling said last named circuit and controlled by said movable structure.

15. Control apparatus comprising the combination with a selector member deflecting in opposite directions from a fixed normal position, of apparatus for exerting on said selector member a force to deflect it in either direction, a temperature-responsive device controlling said apparatus, a pair of circuits, a pair of co-acting contacts controlling each of said circuits, means periodically engaging said selector member for effecting periodic closures of one or the other of said circuits depending upon the direction of deflection of said selector member, movable structure, means controlled by said circuits for actuating said movable structure in one direction or the other depending upon the direction of deflection of said selector member, and means actuated by said movable structure effecting a change in the force exerted on said selector member by said apparatus.

16. Control apparatus comprising a galvanometer having a deflecting member deflecting in opposite directions from a fixed normal position, means responsive to changes in temperature controlling said galvanometer, a pair of circuits, a pair of co-acting contacts controlling each of said circuits, means periodically actuating said deflecting member against another member when deflected for effecting periodic closure of one of said circuits through its pair of co-acting contacts, movable structure, means controlled by said circuits for actuating said movable structure in one direction or the other depending upon the direction of deflection of said deflecting member, and means actuated by said movable structure effecting a change in the effect of said first named means upon said galvanometer.

17. Control apparatus comprising the combination with a galvanometer having a deflecting member, of a temperature-responsive device controlling said galvanometer, a fixed electrical contact, a movable electrical contact, a circuit controlled by said contacts, means periodically clamping said deflecting member when deflected from neutral position between said contacts to effect periodic closure of said circuit, movable structure, means controlled by said circuit for moving said structure, and means controlled by said movable structure effecting a change resulting in a change in the deflection of said galvanometer.

18. Control apparatus comprising the combination with a galvanometer having a deflecting member, of a temperature-responsive device controlling said galvanometer, a fixed electrical contact, a movable electrical contact, a circuit controlled by said contacts, means periodically clamping said deflecting member when deflected from neutral position between said contacts to effect periodic closure of said circuit, movable structure, means controlled by said circuit for moving said structure, and means actuated by said movable structure producing an effect reducing the deflection of said galvanometer.

19. Control apparatus comprising the combination with a selector member, of apparatus for exerting a force on said selector member for deflecting it, a temperature-responsive device controlling the magnitude of the force exerted on said selector member by said apparatus, a path over which energy may be transmitted, a second member periodically engaging said selector member, means co-acting with said selector member when deflected and engaged by said second member to effect transmission of energy over said path, movable structure, means controlled by the energy transmitted over said path for actuating said movable structure, and means controlled by said movable structure effecting a change in the force exerted on said selector member while under the control of said temperature-responsive device.

20. Control apparatus comprising the combination with a seelctor member deflecting in opposite directions from a fixed normal position, of apparatus for exerting a force on said selector member for deflecting it, a temperature-responsive device controlling the magnitude of the force exerted on said selector member by said apparatus, a path over which energy may be transmitted, a second member periodically engaging said selector member, means coacting with said selector member to effect transmission of energy over said path, movable structure, means controlled by the energy transmitted over said path for actuating said movable structure, and means causing a change in the deflection of said selector member comprising a circuit, and a contact actuated by said movable structure for controlling said circuit.

21. Control apparatus comprising a galvanometer having a deflecting member deflecting in opposite directions from a fixed normal position, a temperature-responsive device controlling said galvanometer, a pair of circuits, a pair of co-acting contacts controlling each of said circuits, means periodically actuating said deflecting member when deflected for effecting periodic closure of one of said circuits through its pair of co-acting contacts, movable structure, means controlled by said circuits for actuating said movable structure in one direction or the other depending upon the direction of deflection of said deflecting member, and means actuated by said movable structure effecting a change in the deflection of said galvanometer.

22. Control apparatus comprising a galvanometer having a deflecting member deflecting in opposite directions from a fixed normal position, a temperature-responsive device controlling said galvanometer, a pair of circuits, a pair of co-acting contacts controlling each of said circuits, means periodically actuating said deflecting member when deflected for effecting periodic closure of one of said circuits through its pair of co-acting contacts, movable structure, means controlled by said circuits for actuating said movable structure in one direction or the other depending upon the direction of deflection of said deflecting member, a contact controlled by said movable structure, and means co-acting with said contact producing an effect changing the deflection of said galvanometer.

23. Control apparatus comprising a galvanometer having a deflecting member deflecting in opposite directions from a fixed normal position, a temperature-responsive device controlling said galvanometer, a pair of circuits, a pair of co-acting, contacts controlling each of said circuits, means periodically actuating said deflecting member when deflected for effecting periodic closure of one of said circuits through its pair of co-acting contacts, movable structure, means controlled by said circuits for actuating said movable structure in one direction or the other depending upon the direction of deflection of said deflecting member, and means causing a change in the deflection of said deflecting member comprising a circuit, and a resistance and a contact in said last named circuit and relatively movable by said movable structure with respect to each other.

In testimony whereof I have hereunto affixed my signature in the presence of the two subscribing witnesses.

EDWIN F. NORTHRUP.

Witnesses:
N. FIELD,
A. FARRELL.

Certificate of Correction.

It is hereby certified that in Reissue Letters Patent No. 15,987, granted January 20, 1925, upon the application of Edwin F. Northrup, Princeton, New Jersey, for an improvement in "Control Apparatus," errors appear in the printed specification requiring correction as follows: Page 4, line 68, claim 1, strike out the syllable "se" and line 69 for the word "selected" read *select*, for the word "completed" read *complete said*, and for the words "and means" read *apparatus;* same page and claim, line 71, after the word "path" insert a comma; and that the said Letters Patent should be read with these corrections therein that the same may conform to the record of the case in the Patent Office.

Signed and sealed this 28th day of April, A. D. 1925.

[SEAL.]

KARL FENNING,
*Acting Commissioner of Patents.*